Patented Oct. 8, 1940

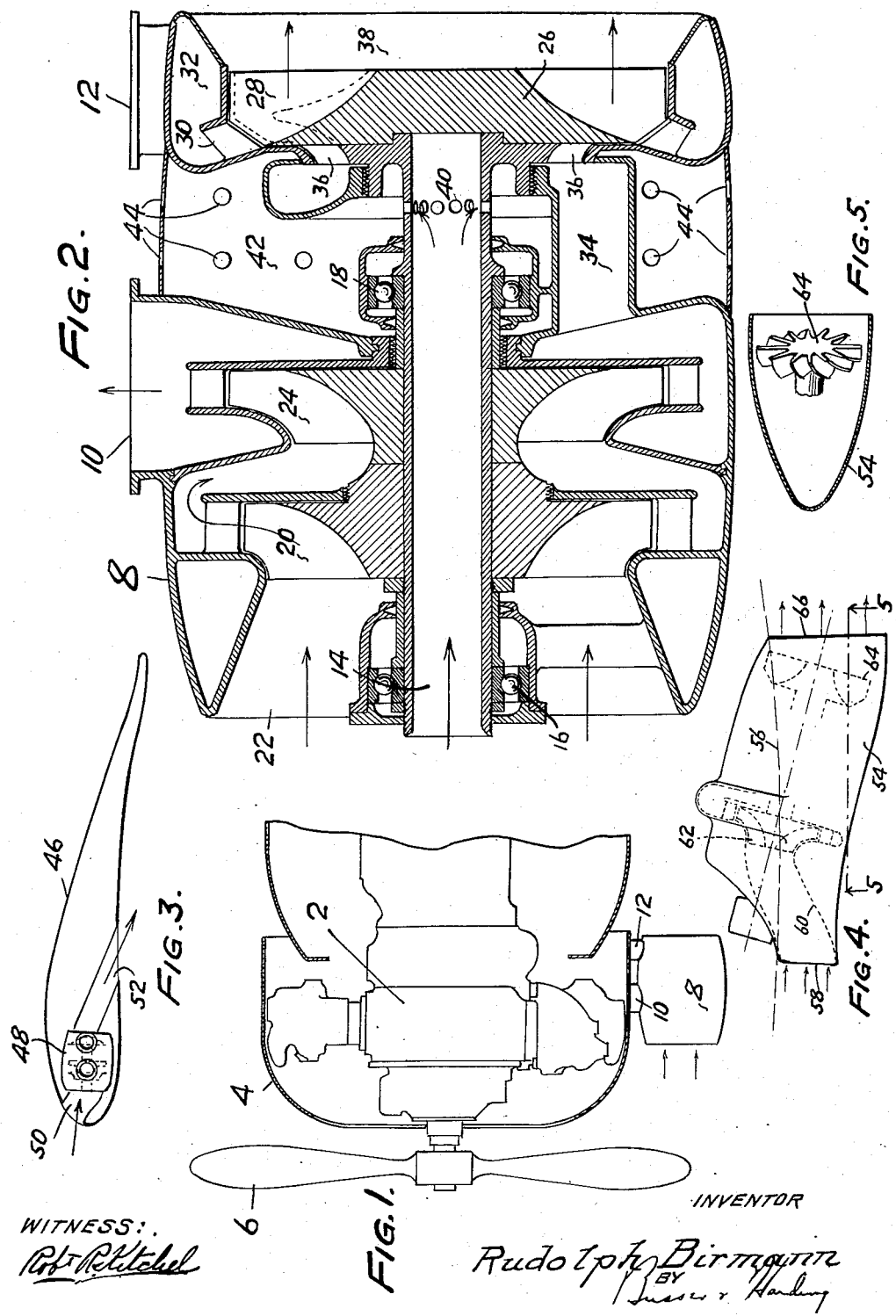

2,216,731

UNITED STATES PATENT OFFICE 2,216,731

TURBOSUPERCHARGER MOUNTING

Rudolph Birmann, Newtown, Pa., assignor to Turbo Engineering Corporation, New York, N. Y., a corporation of Delaware Application December 2, 1937, Serial No. 177,669

7 Claims. (Cl. 60—13)

This invention relates to the mounting of a turbine driven compressor upon a vehicle arranged to move at high velocity, as for example, an airplane, and more particularly relates to the mounting of a turbosupercharger unit arranged to supply compressed air to an internal combustion engine driving the vehicle and to be driven by the exhaust gases from such engine.

The mounting in an airplane or other aircraft of an exhaust turbine driven supercharger presents a difficult problem because there must be met a number of requirements which are to a large extent conflicting with each other. First, there should be no increase in the air resistance or drag of the airplane. Secondly, hot parts of the turbosupercharger unit should be as far away as possible from such parts of the engine that should not be exposed to the heat, such as its carburetors, magnetos, wiring, etc. At the same time, certain parts of the unit, such as the bearings, should if possible be exposed to the slip stream of the propeller for cooling purposes. The air-handling end of the supercharger should be so arranged that it is not heated by the engine or its driving turbine and should, if at all possible, be exposed to the slip stream of the propeller so as to be cooled thereby. The complete installation, furthermore, should be as simple as possible with the exhaust piping and the air ducts as short, clean cut, and simple as possible. Additionally, the unit must be readily accessible and must not interfere with any of the structural members of the airplane.

The customary way of mounting a turbosupercharger is primarily directed to meet the first two of the above mentioned requirements and comprises so mounting the supercharging unit that its axis is perpendicular to the direction of flight and is located in either a vertical or a horizontal plane. The complete unit is recessed within the carefully streamlined outline of the fuselage or the engine nacelle so that the hot turbine wheel is in a position approximately flush with the fuselage and is thus exposed to the cooling effect of the propeller slip stream. A necessary consequence, however, is that the impeller unit is inwardly of the turbine unit adjacent the engine and must be fed by an air horn arranged to scoop in air from the outside so as to avoid the feeding of the impeller by air heated by the engine. The proximity of the compressor portion of the unit to the engine cannot be avoided without increasing the diameter of the entire structure.

In accordance with the present invention, the exhaust turbine driven supercharger is so mounted that the axis of its common compressor and turbine shaft extends approximately in the direction of airflow about the ship, the unit being partially or completely outside of the general streamlined outline of the airplane. On first consideration, this would appear to be a disadvantageous construction inasmuch as the unit would be expected to add considerable drag to the airplane. However, by proper design in accordance with the following disclosure the drag is not increased but may, in fact, be somewhat lessened over that occurring if the unit is completely absent. In other words, the unit may be made to have a negative drag equivalent to an addition to the propeller thrust, the unit being so designed that it tends to fly itself at a higher speed than the airplane.

The objects of the invention indicated above will be understood from the following description read in conjunction with the accompanying drawing, in which:

Figure 1 is a diagrammatic representation of one desirable location of a turbine supercharger unit attached to the forward portion of an airplane;

Figure 2 is a vertical section taken through the axis of a preferred type of supercharger unit;

Figure 3 is a diagrammatic sectional representation of a modified wing mounting for a turbosupercharger unit;

Figure 4 is a diagrammatic representation of a preferred arrangement of a supercharger unit for a high speed plane; and Figure 5 is a section taken on the plane indicated at 5—5 in Figure 4.

Referring first to Figure 1, there is indicated at 2 an internal combustion engine for driving an airplane located within the forward portion of the airplane and covered by the usual nacelle 4 forward of which is the propeller 6. In accordance with the present improvements a turbine driven supercharger unit 8 is located below the nacelle in the slip stream of the propeller 6, being mounted on the airplane through the medium of the compressed air delivery pipe 10 and the exhaust gas pipe 12, with such additional bracing as may be desirable.

Obviously, the location of a unit such as that indicated at 8 in such position could not be tolerated unless the unit was of proper design. The design of a suitable type of unit is indicated more clearly in Figure 2. The unit comprises an exteriorly streamlined housing within which is mounted a hollow shaft 14 in suitable bearings indicated conventionally at 16 and 18. The shaft 14 carries two compressor wheels 20 and 24, providing two stages of compression for air entering substantially axially the opening 22. The compressed air is delivered by the second stage 24 to the engine through the pipe 10. Located rearwardly of the compressor unit and carried by the same shaft 14 is the turbine rotor 26 provided with buckets 28 receiving exhaust gases expanded through nozzles 30 from a gas chest 32 which is supplied with the exhaust gases of the engine through the pipe 12. In order to cool the turbine rotor, a limited amount of compressed air is provided from the second stage of the compressor through the passage 34, to cooling air passages 36 formed in the rotor. The gases discharged from the buckets 28 and from the cooling passages 36 are commingled and discharged substantially axially rearwardly through the tail passage 38.

The hollow shaft which is axially lined up with the stream of air flowing relatively to the airplane during its motion at the location of the unit receives such air and discharges it at 40 beyond the rearmost bearing 18, so that such air flows between the turbine and compressor portions of the unit into the chamber 42 and escapes therefrom through openings 44 in the outer streamlined surface of the housing. It may be noted that the air entering the hollow shaft does not do so merely because of movement of the unit relative to the air stream but also because of the impeller action of the holes 40 at the high speeds of rotation. The air flowing through the hollow shaft in this fashion cools the shaft and thereby the bearings and provides substantial heat insulation between the high temperature rotor and the compressor portions of the unit, which should remain as cool as possible. The former are, of course, also cooled by reason of the stream of air passing about the outside of the housing.

The considerations involved in the proper design of a unit such as the one illustrated are described at length in my application Serial No. 176,979, filed November 29, 1937. Additionally, reference may be made to my prior Patents 1,926,225, dated September 12, 1933; and 1,959,703, dated May 22, 1934. As pointed out in the said application, not only can there be provided a highly efficient exhaust driven turbine arrangement provided with cooling gas passages by the recovery of the heat and pressure energy of the cooling gas, but by the adoption for the various passages of boundary walls of the type described in said application and also in said patents, various factors can be so correlated that definite velocities of discharge from the turbine are possible through the proper expansion of the driving gases and cooling air. Given a sufficient supply of driving gas and by adopting a turbine rotor of the properly limited diameter and by providing the proper nozzles to give a suitable spouting velocity for the gases entering the turbine buckets, it will be obvious that consistent with the recovery of maximum energy from the gases a relative velocity of rearward discharge from the unit illustrated may be obtained such that the relative velocity is substantially equal to or greater than the relative velocity of the slip stream passing the outside of the unit. As pointed out in my said application, the lips of the buckets may be so located that considerable variations between the peripheral speed of the turbine rotor and the spouting velocity of the driving gases may be taken care of to nevertheless provide ideal flow conditions through the turbine buckets. The amount of gas available from the engine for driving purposes may form a limitation on the diameter of the turbine consistent with the securing of axial discharge velocities equal to or greater than the velocity of the air stream.

For the last mentioned reason, and inasmuch as the diameter of the whole unit should be kept as small as possible, there is generally desirable a multiple stage compressor portion of the unit. By the use of a plurality of stages, of which two are shown in Figure 2, any desired terminal pressure is securable, without having the impeller portion of the unit exceed the diameter of the turbine portion to such extent as to make difficult streamlining of the combination unit as illustrated in Figure 2.

There is another limitation on the design of the compressor portion of the unit, namely, that the impellers must be so arranged that the air supplied to the front area of the unit is caused to flow axially at a velocity substantially equal to or greater than the normal velocity, at normal speeds of the airplane, of the air stream flowing about the structure at the location of the unit. This end may be achieved by following the designs of my prior patents which indicate how impellers can be designed so that for any given rotational speed there may be obtained efficiently and directly any desired axial speed of the inflowing air. If in the case of the present design the axial velocity of the air flowing to the impellers when equal to or greater than the velocity of the air stream is such that too great an amount of air would be supplied for the requirements of the engine, the energy imparted to the air is recoverable by causing it to flow through the cooling passages of the turbine rotor wherein, as explained in my said copending application, its energy is recovered both in mechanical energy imparted to the rotor and in driving energy propelling the unit forwardly because of its greater velocity due to increase of volume by heating. In fact, considering the best thermal efficiency of the unit and in order to obtain a greater forward thrust by utilization of exhaust energy which would otherwise be wasted, it is desirable to draw in an excess of cooling air which by maximum cooling of the driving gases and by its own transformation to attain high discharge velocities adds to the propulsive force. Additionally, the streams of air escaping from the cooling passages have an ejector action on the driving gases being exhausted from the buckets thus decreasing the back pressure and increasing the overall efficiency.

The above requirements indicate the factors which must be taken into account in the internal construction of the unit. When in operation, and as viewed as a whole from the exterior, the unit draws into its forward portion air at a velocity substantially lined up with the air stream flowing at the location of the unit, of such amount as to be substantially equal to or even exceed the velocity of the air stream. The effect of this over a transverse cross-section at the forward entrance end of the unit is obviously to produce a net force tending to move the unit forwardly with respect to the normal air stream.

At the same time, the gases discharged rearwardly from the turbine over the exhaust area of the unit are discharged at a velocity greater than the velocity of the air stream at this location so that here again there results a net force tending to move the unit forwardly. As a result, the unit may be considered as a sort of auxiliary propeller and the forces of the unit are such that if the unit were freed from the airplane it would tend to move forwardly relative to the airplane. By providing entrance and discharge velocities of the air and exhaust gases, respectively, as indicated above, the unit does not exert any drag on forward movement of the airplane, but rather may be made to provide an additional forward force tending to advance the airplane. Thus it is that the unit may be located outside the streamlined structure of the airplane without any detrimental effect on the airplane's operation. At the same time, all of the requirements indicated above are satisfied. The unit is spaced substantially from the engine so that no part receives heat from the engine and conversely, none of the elements associated with the engine are subjected to transfer of heat from the extremely hot turbine. Additionally, by the provision of the hollow shaft 14 a certain amount of air passing through this shaft cools the bearings and insulates the turbine portion of the unit from the compressor portion. Obviously, the compressed air and exhaust piping may be made very short and the unit is both readily accessible and without any interference with any of the structural members of the airplane.

While the most desirable type of structure has been described above, it will be clear that the unit may be located in other positions. For example, a unit similar to the one just described may be provided, as indicated at 48 in Figure 3, within the wing structure of the airplane above, at one side, or below the engine. In such case, the wing structure would be provided with an air entrance as indicated at 50 and an exhaust gas exit as indicated at 52, and the entrance and exhaust velocities of gases would be made to at least substantially equal the velocity of air flow at the entrance and exit portions of the respective passages 50 and 52 where these passages join the normal slip stream of the structure associated with the unit.

In the case of airplanes operating at very high speeds, the arrangement illustrated in Figure 1 is not always feasible. Under high speed conditions, it is likely that all of the air necessary for supercharging together with the air which might be used for cooling and have its energy effectively reconverted into mechanical thrust may be passed through an entrance opening of quite small size. Inasmuch as effective streamlining requires that the maximum diameter of a unit such as that of Figure 2 should not greatly exceed the opening receiving the air, the requirement that the opening should be small may very much limit the size of turbocompressor which may be used, this limitation being such that the desired supercharging pressure could not be attained except by extremely high and impractical speeds of rotation of the small impeller.

To obviate this difficulty and still secure the advantages above mentioned, there may be adopted a construction such as that illustrated in Figures 4 and 5. In these figures the outer streamlined housing of the turbocompressor unit indicated at 54 is partially inset within the streamlined airplane structure indicated by the dashed line 56. The arrangement is such that there remains projecting beyond the airplane structure at the inlet end of the unit an area indicated at 58 just sufficient for the handling of the required air at the normal velocity of flight. From this entrance 58, which the air enters in smooth fashion, a smooth passage 60 leads it to the inlet of the first impeller stage indicated at 62. The parts of the turbocompressor unit are indicated diagrammatically in Figure 4 and may be the same as previously discussed in connection with Figure 2, the driving turbine being indicated at 64. The turbine 64 in turn delivers the exhaust gases and cooling air through a smoothed flow passage terminating over a large area indicated at 66, so chosen that at normal velocities of flight, exhaust gas and cooling air exhausted at 66 will have a velocity equal to that of the air stream at this location. In general, conditions will be such that to secure the same or greater velocity of the exhaust gases compared with the stream of air flowing by the unit at this location, the exhaust opening 66 may be very substantially larger than the intake opening 58. Accordingly, it is convenient to tilt the axis of rotation of the rotors as indicated in Figure 4. It will be noted that an approximate cylindrical form of the housing 54 results in streamlining in the direction of flow of the slip stream of air, as will be made evident by the section of Figure 5. Smooth lead passages at both the intake and exhaust result in only minor friction losses and the unit may be designed in line with the considerations detailed above.

While the invention has been described primarily with respect to its application to aircraft, it will be obvious that it may be applied (generally in substantially larger form) to the supercharging requirements of high speed locomotives driven by internal combustion engines of the Diesel or other types. In such cases, the unit may be mounted accessibly exteriorly of the locomotive structure without increasing the air drag thereon.

What I claim and desire to protect by Letters Patent is:

1. In combination with a vehicle adapted for high speeds and driven by an internal combustion engine, a turbine-centrifugal compressor unit, and means for leading exhaust gases from said engine to said unit to drive the latter, said unit having receiving and discharge openings and being carried by the vehicle with its receiving opening facing in the direction of flow of air relative to the vehicle at the location of the unit, with the compressor opening forwardly and receiving air flowing through the receiving opening, and with the turbine portion of the unit discharging its gases rearwardly through the discharge opening, said unit being provided with a hollow shaft arranged to receive axially flowing air and discharge it outwardly between the compressor and turbine portions of said unit.

2. In combination with a vehicle adapted for high speeds and driven by an internal combustion engine, a turbine-centrifugal compressor unit, and means for leading exhaust gases from said engine to said unit to drive the latter, said unit having receiving and discharge openings and being carried by the vehicle with its receiving opening facing in the direction of flow of air relative to the vehicle at the location of the unit, with the compressor opening forwardly and receiving air flowing through the receiving opening, and with the turbine portion of the unit discharging its gases rearwardly through the discharge opening, said unit being provided with a hollow shaft arranged to receive axially flowing air and discharge it outwardly between the compressor and turbine portions of said unit, the bearings of said shaft being located forwardly of the location of said discharge from the hollow shaft.

3. In combination with a vehicle adapted for high speeds and driven by an internal combustion engine, a turbine-centrifugal compressor unit, and means for leading exhaust gases from said engine to said unit to drive the latter, said unit having receiving and discharge openings and being carried by the vehicle with its receiving opening facing in the direction of flow of air relative to the vehicle at the location of the unit, with the compressor opening forwardly and receiving air flowing through the receiving opening, and with the turbine portion of the unit discharging its gases rearwardly through the discharge opening, the turbine being provided with cooling passages having corresponding outlets and being supplied with cooling air from the compressor, and the compressor forcing through the cooling passages air in excess of that required for cooling which will become heated and thereafter expand to secure a higher discharge velocity and produce additional propulsive force.

4. In combination with a vehicle adapted for high speeds and driven by an internal combustion mechanism, a turbine-compressor unit comprising a shaft and turbine and compressor rotors thereon, means for leading exhaust gases from said internal combustion mechanism to said turbine to drive the latter, said unit having receiving and discharge openings and being carried by the vehicle with its receiving opening facing, and its shaft extending, substantially in the direction of flow of air relative to the vehicle at the location of said unit, with the compressor opening forwardly and receiving through said receiving opening air at a rapid rate, and with the turbine expanding the gases flowing through its passages to substantially the pressure of the atmosphere about the vehicle and discharging them rearwardly from its passages and through said discharge opening at a rapid rate, with the resultant production of a forward thrust by the action of said unit at least substantially equal to the drag on the vehicle occasioned by the presence of the unit.

5. In combination with a vehicle adapted for high speeds and driven by an internal combustion mechanism, a turbine-compressor unit comprising a shaft and turbine and compressor rotors thereon, means for leading exhaust gases from said internal combustion mechanism to said turbine to drive the latter, said unit having receiving and discharge openings and being carried by the vehicle with its receiving opening facing, and its shaft extending, substantially in the direction of flow of air relative to the vehicle at the location of said unit, with the compressor opening forwardly and receiving through said receiving opening air at a rapid rate, and with the turbine expanding the gases flowing through its passages to substantially the pressure of the atmosphere about the vehicle and discharging them rearwardly from its passages and through said discharge opening at a rapid rate, said compressor being driven so that the unit takes air at a rate at least substantially equal to the rate of flow of air relative to the vehicle at normal speeds of movement of the vehicle and at the location of the unit, with the resultant production of a forward thrust by the action of said unit at least substantially equal to the drag on the vehicle occasioned by the pressure of the unit.

6. In combination with a vehicle adapted for high speeds and driven by an internal combustion mechanism, a turbine-compressor unit comprising a shaft and turbine and compressor rotors thereon, means for leading exhaust gases from said internal combustion mechanism to said turbine to drive the latter, said unit having receiving and discharge openings and being carried by the vehicle with its receiving opening facing, and its shaft extending, substantially in the direction of flow of air relative to the vehicle at the location of said unit, with the compressor opening forwardly and receiving through said receiving opening air at a rapid rate, and with the turbine expanding the gases flowing through its passages to substantially the pressure of the atmosphere about the vehicle and discharging them rearwardly from its passages and through said discharge opening at a rapid rate, said turbine discharging its gases at a backward rate at least substantially equal to the rate of flow of air relative to the vehicle at normal speeds of the vehicle and at the location of the unit, with the resultant production of a forward thrust by the action of said unit at least substantially equal to the drag on the vehicle occasioned by the presence of the unit.

7. In combination with a vehicle adapted for high speeds and driven by an internal combustion mechanism, a turbine-compressor unit comprising a shaft and turbine and compressor rotors thereon, means for leading exhaust gases from said internal combustion mechanism to said turbine to drive the latter, said unit having receiving and discharge openings and being carried by the vehicle with its receiving opening facing, and its shaft extending, substantially in the direction of flow of air relative to the vehicle at the location of said unit, with the compressor opening forwardly and receiving through said receiving opening air at a rapid rate, and with the turbine expanding the gases flowing through its passages to substantially the pressure of the atmosphere about the vehicle and discharging them rearwardly from its passages and through said discharge opening at a rapid rate, said compressor being driven so that the unit takes air at a rate at least substantially equal to the rate of flow of air relative to the vehicle at normal speeds of movement of the vehicle and at the location of the unit, and said turbine discharging its gases at a backward rate at least substantially equal to the rate of flow of air relative to the vehicle at normal speeds of the vehicle and at the location of the unit, with the resultant production of a forward thrust by the action of said unit at least substantially equal to the drag on the vehicle occasioned by the presence of the unit.

RUDOLPH BIRMANN.

CERTIFICATE OF CORRECTION.

Patent No. 2,216,731. October 8, 1940.

RUDOLPH BIRMANN.

It is hereby certified that error appears in the printed specification of the above numbered patent requiring correction as follows: Page 4, second column, line 7, claim 5, for the word "pressure" read --presence--; and that the said Letters Patent should be read with this correction therein that the same may conform to the record of the case in the Patent Office.

Signed and sealed this 12th day of November, A. D. 1940.

(Seal)

Henry Van Arsdale,
Acting Commissioner of Patents.